United States Patent Office 3,172,727
Patented Mar. 9, 1965

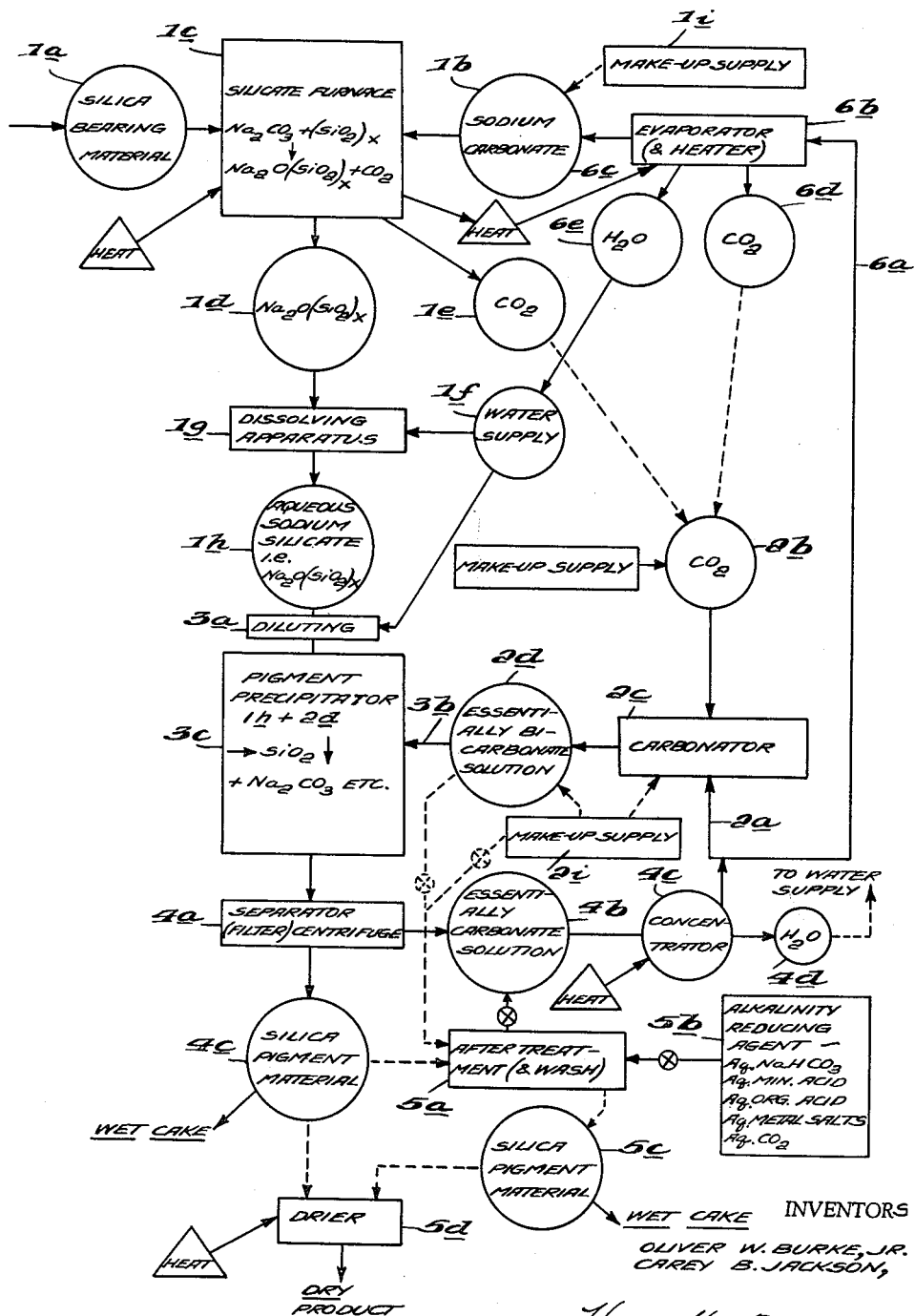

3,172,727
CYCLIC PROCESS FOR PRODUCING
SILICA PIGMENT
Oliver W. Burke, Jr., 506 Intracoastal Drive, Fort Lauderdale, Fla., and Carey B. Jackson, Pompano Beach, Fla.; said Jackson assignor to said Burke
Filed Oct. 3, 1961, Ser. No. 142,665
9 Claims. (Cl. 23—182)

This invention relates to silica pigment materials and to the preparation thereof from silica-bearing materials, such as silica flour, quartz and sand, and aims generally to improve the same.

Particular objects of the present invention, severally and interdependently, are to provide an improved process for the preparation of silica pigment including but not limited to, silica pigment of reduced alkalinity; to provide a process which in operation requires as raw material essentially only the pigment producing materials; and to provide an improved silica pigment having useful characteristics and at an economical cost.

Other objects and advantages of the invention will be apparent from a consideration of the following general and specific description of illustrative embodiments thereof.

In general, in accordance with the present invention the improved pigment is produced by a new process consisting of four integrated steps, (1) forming sodium silicate by reacting sodium carbonate and silica, (2) preparing sodium bicarbonate from sodium carbonate with the aid of carbon dioxide and water, (3) forming silica pigment by reacting sodium silicate solution with sodium bicarbonate solution, and (4) effecting economy and purification by recycling of by-products within the system.

In a preferred embodiment, in step (1) sand or other source of relatively pure silica is reacted with sodium carbonate and converted to carbon dioxide and sodium silicate and the latter is dissolved in water; in step (2) carbon dioxide, which may be derived from step (1), is reacted with aqueous sodium carbonate to produce sodium bicarbonate; in step (3) the aqueous solution containing sodium bicarbonate from step (2) is reacted with an aqueous solution of sodium silicate from step (1) to produce sodium carbonate solution and a precipitate of silica pigment material which is separated from the aqueous sodium carbonate, the latter being concentrated and recycled to steps (1) and (2) of the process in step (4).

In its preferred embodiments, this process for converting silica to silica pigment requires only an initial charge of sodium bicarbonate or reactants for forming the same with subsequent make-up thereof to provide for processing losses. Process efficiency is thus accomplished in the present process. In the instant case, moreover, this recycling does not result in collection of impurities in the system. To the contrary, since the silica pigment material is finely divided and highly adsorbent it tends to sequester and remove any impurities finding their way into the system so that the recycled materials tend to become more and more nearly pure as recycling continues. For this reason, as the recycled materials become purified, the purity of the silica pigment product being obtained ultimately is limited only by the nature and purity of the silica-bearing and make-up materials fed to the system. This fact simplifies the problem of quality control.

Where sodium carbonate solution is being transferred from step (3) to step (1) and to step (2) it preferably contains some sodium bicarbonate. When sodium bicarbonate is circulated from step (2) to step (3) it preferably contains some sodium carbonate.

General and particular aspects of the process according to the present invention will best be understood by reference to the following detailed specification of preferred embodiments of the invention, taken in connection with the accompanying drawing forming a part thereof, wherein:

FIG. 1 is a flow sheet illustrating the sequence of steps and flow of materials in a preferred embodiment of process according to the invention.

In such preferred embodiment, in step (1) the silica-bearing material such as silica flour, silica sand, or the like (as indicated at 1a in the drawing), together with sodium carbonate (1b), is fed to a reactor such as a silicate furnace (1c) wherein sodium silicate (1d) is formed by reacting at elevated temperature the silica bearing material (1a) and the sodium carbonate (1b) with the elimination of carbon dioxide (1e). There is thus formed a water soluble sodium silicate glass consisting of an intimate combination of from 1 to 4 moles of silica per mole of sodium oxide. Preferably, in the present process the ratio of $SiO_2$ to $Na_2O$ is kept near the upper end of this range, a ratio of 3 to 3.9 moles of $SiO_2$ per mole of $Na_2O$ being preferred. The silicate furnace may be an open hearth furnace of the regenerative or recuperative type, which for the purposes of this invention may be adapted for the recovery of the carbon dioxide gas therefrom (as indicated at 1e). A preliminary heating at about 700° C. may be employed, and allows most of the carbon dioxide to be removed, and the reaction (in 1c) is preferably completed in the range of 1200–1400° C. Where the sodium carbonate (1b) is being prepared by evaporation of a solution with or without decomposition of sodium bicarbonate, as in step (6) hereinafter described, the hot gases from step (1) may be employed for effecting such heating.

The product of step (1) is then dissolved in sufficient water, in one or more steps (1g and 3a) to form a relatively dilute solution having a solids content of $Na_2O(SiO_2)_x$, in the range of 5% to 20% preferably 8% to 12%. In the initial dissolving step (1g) a solids content is preferably produced of about 35% to 40% by weight, and the sodium silicate may conveniently be passed to intermediate storage (1h) at this concentration.

The solution (1h) appropriately diluted (at 3a) is conveyed to a pigment precipitator (3c) and combined with an essentially sodium bicarbonate aqueous solution (2d) in a manner, and in a sufficient quantity, to effect complete precipitation of the silica present in the form of finely divided reinforcing silica pigment material, an excess of the sodium bicarbonate preferably being added after such precipitation as an alkalinity reducer as hereinafter described.

As shown in the drawing the essentially sodium bicarbonate solution (2d) is prepared by carbonation in a carbonator (2c) of sodium carbonate solution (4b) resulting from the precipitating reaction (3c). The essentially sodium bicarbonate aqueous solution (2d) may contain some minor quantity of sodium carbonate, or some excess carbon dioxide.

The silica pigment material (4c) is separated as a wet cake from the relatively dilute essentially sodium carbonate solution (4b) by suitable separating means (4a) such as a filter and/or centrifuge, or the like, and the said carbonate solution (4b) is recycled, preferably after being concentrated in a concentrator (4c) the heat for which may be supplied from the furnace (1c). Where economic and desirable, the water (4d) removed in the concentrator (4c) may be returned to the water supply (1f) used to prepare and dilute the aqueous sodium silicate (in 1g and 3a).

The recycled concentrated sodium carbonate solution (from 4c) is in part delivered to the carbonator (2c) wherein the sodium carbonate solution is converted to essentially sodium bicarbonate solution (2d) (or even to sodium bicarbonate solution containing dissolved $CO_2$ gas under pressure) which essentially sodium bicarbonate solution (2d) is at least for the most part recycled to the pigment precipitator (3c). The balance of the concentrated essentially sodium carbonate solution (from 4c) is recycled to the silicate furnace (1c), after evaporation (and desirably decomposition of any sodium bicarbonate present) in an evaporation step (6b).

The separated silica pigment material (4c) may be removed as wet cake for further use with or without any further after treatment. When after-treatment (5) is employed the silica pigment material (4c) may be reduced in alkalinity as by washing or soaking with any one of several alkalinity reducing agents (5a). Thus sodium bicarbonate solution (2d) from the carbonator or from a make-up supply as shown, may be employed for this purpose and thereafter be added to the sodium carbonate solution (4b). Aqueous solution of soluble mineral acid, organic acid or carbon dioxide (5b), may be employed as alkalinity reducing agent in lieu of or in addition to the sodium-bicarbonate after-treatment, and/or aqueous salts of the metals from groups II through VI, preferably groups II through IV, of the periodic table, may be so employed. Finally, the after-treated pigment may be water washed (5a), and/or be separated as a wet cake (5c). The alkalinity contained with the precipitate (4c) may be completely neutralized by prolonged soaking with the alkalinity reducing agents with or without agitation, but preferably is only partly neutralized therewith.

If desired the wet cake (4c or 5c) may be employed per se, as for example in master-batching with latices of natural or synthetic elastomers or plastomers or combinations of these, or the water may be removed to form dry silica pigment material as indicated (at 5d). Depending on which is the cheaper at any given time the sodium salt make-up may consist of sodium hydroxide, sodium bicarbonate, or sodium carbonate introduced at any appropriate place in the system as indicated in the drawing (at 1i and 2i), e.g. at the carbonator (2c) in any of these forms, to the bicarbnoate supply (2d) or the after-treatment (5) as bicarbonate solution, or to the sodium carbonate supply (1f) as sodium carbonate.

When a plentiful source of cheap carbon dioxide is available it may replace in whole or in part the carbon dioxide from the silicate furnace. Similarly the minor proportions of carbon dioxide (6d) and water (6c) from the evaporator (6b) may be recovered or be replaced by make-up supplies when this is more economical. Under appropriate climatic conditions solar heat may be employed for one or more of the steps of concentration (4c), evaporation (6b) and drying (5c).

Thus, as shown in the drawing, the process essentially consists in converting coarse silica bearing material to fine silica pigment material in a recycle system, with or without after-treatment of the pigment, and with or without full recovery of evolved carbon dioxide and water.

The novel features of the invention are set forth in the claims appended hereto, but the invention itself will be more precisely understood by reference to the following specific examples embodying the same, which are to be considered as illustrative and not restrictive of the invention.

The invention may be practiced batchwise, stepwise, or continuously, depending on available equipment.

EXAMPLE 1

A (step 1). Silica flour and sodium carbonate were ground together in the ratio approximately of 830 grams to 470 grams and heated in an electric furnace in which carbon dioxide was evolved. The evolution of carbon dioxide which can be used in step 3, started at about 500°–700° C. and was completed as the temperature approached 1000° C.–1200° C. After 2 hours at about 1000–1200° C. the fusion was complete. The molten sodium silicate, of composition $Na_2O(SiO_2)_{3.2}$, was run onto plates to partially cool and then dissolved in sufficient water to yield aqueous sodium silicate of a solids content of 37.6% by weight.

B (step 3). Thereafter 2860 grams of aqueous sodium silicate solution of the above concentration and composition was diluted in a 34 liter porcelainized vessel with 4 liters of water while agitating with a 3 bladed propellor of 3" diameter driven at 600 r.p.m. To this diluted aqueous silicate of soda there was added over a period of 6¾ hours 690 g. (8.2 moles) of sodium bicarbonate dissolved in 5 liters of warm water. The rate of addition of the aqueous sodium bicarbonate was:

| Time (hrs.)— | Sodium bicarbonate added (moles) |
|---|---|
| 1.75 | 1.20 |
| 2.75 | 1.68 |
| 3.75 | 2.28 |
| 5.75 | 3.12 |
| 6.50 | 5.9 |
| 6.75 | 8.2 |

Precipitation of the silica pigment began when about 2.5 moles of the sodium bicarbonate (per 4.1 moles of the sodium silicate) had been added and was apparently complete before the entire 8.2 moles had been added.

The silica precipitate was filtered and washed with 1 liter of water yielding 10 liters of filtrate and 2600 g. of filter cake which contained about 60% to 70% water. About one-third of this filter cake was water washed, dried in an oven at 105° C., ground, and screened thru a 150 mesh screen and this product was designated as "silica A."

C (step 2). Sufficient of the sodium carbonate in the 10 liters of filtrate from step 4 is converting to sodium bicarbonate for recycle to step 3, by treatment with carbon dioxide—available from step (1)—as follows: the 10 liters of aqueous sodium carbonate filtrate, by differential titration is shown to contain 5.8 moles of sodium carbonate and 0.3 mole of sodium bicarbonate. Accordingly 7 liters of the solution by evaporation is concentrated to 5 liters and introduced into a pressure vessel and while agitating treated with carbon oxide—available from step (1)—which converts the sodium carbonate to sodium bicarbonate so that the concentrated and carbonated solution contains about 700 grams sodium bicarbonate—available for recycle to step 3. The remaining 3 liters of filtrate from step 4 is evaporated to dryness, and sufficient make-up (soda ash) is added to compensate for handling losses, and is returned to the supply of sodium carbonate for recycle to step 1. Alternatively the 3 liters to be evaporated to dryness can be concentrated with the 7 liters (as at 4c in the drawing), and if desired the functions of the concentrator (4c) and evaporator (6b) may be combined in a single unit. As another alternative, which eliminates the need for concentrator (4c), about five liters of the filtrate (4b) may be delivered to the carbonator (2c) and be augmented there with either sodium hydroxide or sodium carbonate, and be carbonated there, the quantities being appropriate to restore the concentration of $NaHCO_3$ to at least 8.2 moles in the five liters of solution. When caustic soda is used as make-up here, additional $CO_2$ will be required for carbonation. Or alternatively all or part of the make-up may be supplied as sodium bicarbonate added here either before or after carbonation, all as indicated in the drawings, provided that in every case the resulting solution (3b) corresponds essentially to that supplied initially to the pigment precipitator (3c).

D (step 5).—The remaining two-thirds of the siliceous filter cake was divided into two portions which were treated as follows:

A one-third portion of the filter cake from step (3) was water washed and acidified with 2 N hydrochloric acid until acid to phenolphthalein, then filtered, dried in an oven at 105° C., ground and screened thru a 150 mesh screen and this product was designated as "silica B."

The last third of the filter cake was water washed and treated with carbon dioxide (10 p.s.i.) for 3 hours, filtered and dried at 105° C., ground and screened thru a 150 mesh screen and this product was designated as "silica C."

The three samples of silica pigment material A, B and C were each compounded with a butadiene-styrene type elastomer (SBR–1500) according to the compounding recipe set forth in Table I herewith.

*Table I*

| Compound Ingredients | Quantities (grams) |
|---|---|
| Butadiene-styrene copolymer [1] | 100.0 |
| Silica Pigment Material | 58.5 |
| Antioxidant 2,2-Methylene-bis(4-methyl-6-t.-butylphenol)[2] | 2.0 |
| Triethanolamine | 1.0 |
| Paracoumarone-indene resin [3] | 10.0 |
| Stearic acid | 3.0 |
| Zinc oxide | 5.0 |
| Di-2-benzothiazyl disulphide [4] | 1.25 |
| N,N′-Di-o-tolylguanidine [5] | 1.75 |
| Sulfur | 3.0 |

[1] SBR–1500.
[2] Antioxidant 2246, a trademark product of American Cyanamid Co.
[3] Cumar Resin RH, a trademark product of Allied Chemical Corp.
[4] Altax, a trademark product of R. T. Vanderbilt Co., Inc.
[5] DOTG, a trademark product of American Cyanamid Co.

In compounding the stock the selected silica pigment material is milled into the SBR–1500 together with the antioxidant and the stock aged overnight and then milled with the remaining compounding ingredients and cured for 45 minutes at 287° F. Silica samples A, B and C each readily dispersed in the SBR–1500 yielding a translucent stock.

The physcal test data for these vulcanizates containing silicas A, B and C are set forth in Table II herewith.

*Table II*

| Silica Tested (in vulcanizate) | Tensile, (p.s.i.) | Elongation (percent) | Modulus (300%) | Hardness (Shore A) |
|---|---|---|---|---|
| A | 2,490 | 550 | 758 | 65 |
| B | 3,345 | 625 | 1,040 | 63 |
| C | 3,430 | 625 | 1,200 | 67 |

The ultimate tensile values at break shown by this physical test data characterize all of the silica materials A, B and C as reinforcing silica pigment materials, and it will further be observed that the after-treated pigments B and C are better reinforcing pigments than the more alkaline silica pigment A.

EXAMPLE 2

This example further illustrates the recycle system set forth in Example 1, and that said recycle system can tolerate variation in temperature, concentration and rate of addition to the precipitator (3b). This example was conducted in the same manner and with the same quantities as in Example 1, except that the sodium bicarbonate solution contained a concentration of 1.2 moles of sodium bicarbonate per liter, was maintained at 50 to 60° C. and was added more rapidly to the sodium silicate solution, which was maintained heated to boiling. The rate of addition to the boiling and agitated sodium silicate solution was as follows.

| Time (minutes): | Sodium bicarbonate added (cumulative) (moles) |
|---|---|
| 3 | 0.12 |
| 4 | 0.24 |
| 8 | 0.60 |
| 16 | 1.08 |
| 19 | 1.20 |
| 26 | 1.38 |
| 33 | 1.50 |
| 38 | 1.56 |
| 45 | 1.80 |
| 50 | 2.04 |
| 57 | 2.40 |
| 62 | 2.64 |
| 65 | 3.00 |
| 70 | 3.78 |
| 80 | 6.00 |
| 83 | 7.20 |
| 86 | 8.20 |

Initial precipitation of silica pigment material occurred after about 2.64 moles of sodium bicarbonate had been added. The silica settled quickly in the liquid and was very easy to filter. The filtration was carried out on two Buchner laboratory suction funnels. The cake on the first filter was washed on the filter with one liter of tap water. This cake weighed 2120 g. and contained about 20% solids. The further treatment of this cake (I) will be described below. The other cake was slurried in three liters of tap water and filtered yielding a cake of 1905 g. containing about 27% solids. The treatment of this cake (II) will be described below.

The first filtrates from Cakes I and II were combined yielding 7.2 liters of solution which contained sodium salts equivalent to 300 g. $Na_2O$ or 512 g. of sodium carbonate available for recycling. Additional alkali available for recycling was collected on the washing of the cakes equivalent to 165 g. of sodium carbonate.

Cake I was divided into two approximately equal portions. The first of these portions was dried, ground and screened through 150 mesh and designated as "silica D." The second of the two portions was slurried with an equal volume of water and acidified with 0.8 N hydrochloric acid to a pH of 4.5 and after two hours was filtered, washed, dried, ground and screened through 150 mesh and designated as "silica E."

Cake II was also divided into two approximately equal portions. The first of these portions was slurried with two volumes of water, placed in a pressure vessel and agitated while being pressured with $CO_2$ at 10 p.s.i.g. for 2 hours, and recovered by filtering, washing, drying and grinding and screening through a 150 mesh screen, and designated "silica F." Alternatively, in lieu of this treatment with $CO_2$ under pressure, a volume of the filter cake may be treated with four volumes of 0.1 N sodium bicarbonate solution, before recovery. The second portion of Cake II was diluted with two volumes of water, acidified with 0.8 N hydrochloric acid to a pH of 4.5 and after two hours the pH was adjusted to approximately 7.0 by the addition of 0.1 N sodium carbonate solution. After filtering, washing, drying, grinding and screening as before, the material was designated as "silica G."

Portions of these four silicas D, E, F, and G were compounded with elastomer and compounding ingredients in the same manner as was done in Example 1 (see Table I) and the resulting stocks were cured for 45 minutes at 287° F. Silicas D, E, F, and G readily dispersed in the SBR–1500 yielding translucent stocks.

The physical test data for the resulting vulcanizates are set forth in Table III, herewith.

*Table III*

| Silica Tested (in vulcanizate) | Tensile (p.s.i.) | Elongation (percent) | Modulus (300%) | Hardness (Shore A) | Alkalinity (percent as $Na_2O$) |
|---|---|---|---|---|---|
| D | 1,930 | 500 | 695 | 67 | 16.3 |
| E | 2,305 | 475 | 1,338 | 68 | 0.47 |
| F | 2,985 | 550 | 1,370 | 68 |  |
| G | 2,520 | 525 | 1,230 | 66 | 1.0 |
| H | 2,343 | 575 | 885 | 64 |  |

The ultimate tensile values at break here again characterize the silica materials D, E, F and G as reinforcing silica pigment materials.

Alternatively, the wet filter cake used to produce silica pigment material D, in the amount of 60 grams, dry solids basis, is slurried with two volumes of water, after which is added three liters of 0.12 N aqueous calcium chloride solution. After two hours, the product is filtered, washed, dried, ground and screened (150 mesh), and a silica pigment yielding a tensile strength comparable to those obtained with silicas E, F and G is produced. Further, in lieu of the calcium chloride solution of this example one may employ in about equivalent quantity 0.12 N magnesium chloride solution, 0.1 N aluminum sulfate solution, or the like, with comparable results. The physical properties of the silica material treated with the alkalinity reducing agent magnesium chloride (designated "silica H") are set forth in Table III herewith.

While there have been described herein what are at present considered preferred embodiments of the invention, it will be obvious to those skilled in the art that minor modifications and changes may be made without departing from the essence of the invention. It is therefor understood that the exemplary embodiments are illustrative and not restrictive of the invention, the scope of which is defined in the appended claims, and that all modifications that come within the meaning and range of equivalents of the claims are intended to be included therein.

We claim:

1. A cyclical process for forming silica pigment which comprises:
   (a) delivering 1 to 4 moles of silica in the form of silica sand and 1 mole of sodium carbonate to a fusion reactor and heating to fuse the same and form carbon dioxide and sodium silicate of the formula $Na_2O(SiO_2)_x$ wherein $x$ has a value between 1 and 4,
   (b) delivering to a carbonator carbon dioxide and an aqueous solution comprising essentially sodium carbonate and effecting reaction therebetween to form an aqueous solution comprising essentially sodium bicarbonate as reactant,
   (c) dissolving in water the sodium silicate formed in step (a) to form an aqueous solution essentially comprising sodium silicate,
   (d) delivering the aqueous solutions formed in steps (b) and (c) into a common reactor and effecting reaction between the dissolved sodium bicarbonate and the dissolved sodium silicate transferred to said reactor therein to form an aqueous solution comprising essentially sodium carbonate with a precipitate of silica pigment therein,
   (e) separating from the silica pigment aqueous solution comprising essentially sodium carbonate resulting from step (d), and
   (f) recycling to step (b) aqueous solution comprising essentially sodium carbonate separated in step (e).

2. A process according to claim 1, further comprising the step of
   (g) concentrating the solution being recycled in step (f) by the removal of water therefrom before delivering the same to step (b).

3. A process according to claim 1, further comprising the step of
   (g) recycling to step (a) a part of the sodium carbonate separated in step (e).

4. A process according to claim 3, further comprising the step of
   (h) removing water from the solution being recycled in step (g) before the sodium carbonate therein is delivered to step (a).

5. A process according to claim 1, further comprising the step of
   (g) employing carbon dioxide formed in step (a) as at least a part of that which is delivered to the carbonator as required in step (b).

6. A process according to claim 1, in which in step (b) the reaction involves only a part of the sodium carbonate of the aqueous solution comprising essentially sodium carbonate, leaving a remainder of sodium carbonate in the aqueous solution comprising essentially sodium bicarbonate as reactant, which remainder aids in precipitating the silica pigment material.

7. A cyclical process for forming silica pigment which comprises:
   (a) delivering 1 to 4 moles of silica in the form of silica sand and 1 mole of sodium carbonate to a fusion reactor and heating to fuse the same and form carbon dioxide and sodium silicate of the formula $Na_2O(SiO_2)_x$ wherein $x$ has a value between 1 and 4,
   (b) delivering to a carbonator carbon dioxide and an aqueous solution comprising essentially sodium carbonate and effecting reaction therebetween to form an aqueous solution comprising essentially sodium bicarbonate as reactant,
   (c) dissolving in water the sodium silicate formed in step (a) to form an aqueous solution essentially comprising sodium silicate,
   (d) delivering the aqueous solutions formed in steps (b) and (c) into a common reactor and effecting reaction between the dissolved sodium bicarbonate and the dissolved sodium silicate transferred to said reactor therein to form an aqueous solution comprising essentially sodium carbonate with a precipitate of silica pigment therein,
   (e) separating from the silica pigment aqueous solution comprising essentially sodium carbonate resulting from step (d),
   (f) recycling to step (a) sodium carbonate separated in step (e).

8. A process according to claim 7, further comprising the step of
   (g) removing water from the solution separated in step (e) before the sodium carbonate therein is delivered to step (a).

9. A process according to claim 7, further comprising the step of
   (g) employing carbon dioxide formed in step (a) as at least a part of that which is delivered to the carbonator as required in step (b).

References Cited in the file of this patent

UNITED STATES PATENTS

| | | |
|---|---|---|
| 2,010,655 | Wollner | Aug. 6, 1935 |
| 2,940,830 | Thornhill | June 14, 1960 |

FOREIGN PATENTS

| | | |
|---|---|---|
| 299,483 | Great Britain | Oct. 29, 1928 |
| 845,565 | Great Britain | Aug. 24, 1960 |

OTHER REFERENCES

Jacobson: "Encyclopedia of Chemical Reactions," vol. 6, Reinhold Publishing Corp., New York, 1956, page 332, reaction VI–1473.